(12) United States Patent
Wieneke

(10) Patent No.: US 8,896,849 B2
(45) Date of Patent: Nov. 25, 2014

(54) METHOD FOR DETERMINING A SET OF OPTICAL IMAGING FUNCTIONS FOR THREE-DIMENSIONAL FLOW MEASUREMENT

(75) Inventor: Bernhard Wieneke, Goettingen (DE)

(73) Assignee: Lavision GmbH, Goettingen (DE)

( * ) Notice: Subject to any disclaimer, the term of this patent is extended or adjusted under 35 U.S.C. 154(b) by 380 days.

(21) Appl. No.: 13/511,707

(22) PCT Filed: Dec. 9, 2010

(86) PCT No.: PCT/EP2010/007494
§ 371 (c)(1),
(2), (4) Date: May 24, 2012

(87) PCT Pub. No.: WO2011/076346
PCT Pub. Date: Jun. 30, 2011

(65) Prior Publication Data
US 2012/0274746 A1    Nov. 1, 2012

(30) Foreign Application Priority Data
Dec. 23, 2009  (DE) .......................... 10 2009 060 580

(51) Int. Cl.
*G01B 11/22* (2006.01)
*G06T 7/00* (2006.01)
*G01P 5/00* (2006.01)

(52) U.S. Cl.
CPC ............... *G06T 7/0065* (2013.01); *G01P 5/001* (2013.01); *G06T 7/0018* (2013.01); *G06T 2207/10028* (2013.01)
USPC ............... 356/627; 348/46; 348/47; 356/623; 356/625

(58) Field of Classification Search
USPC ........... 356/3.13, 611, 625, 627, 623; 348/46, 348/47; 382/154
See application file for complete search history.

(56) References Cited

U.S. PATENT DOCUMENTS 7,382,900 B2   6/2008  Wieneke
8,120,755 B2   2/2012  Wieneke
(Continued)

FOREIGN PATENT DOCUMENTS

DE          103 12 696 B3   12/2004
DE    10 2006 055 746        5/2008
(Continued)

OTHER PUBLICATIONS

Ralph Lindken et al.—"Stereoscopic micro particle image velocimetry", Experiments in Fluids, vol. 41, No. 2, May 30, 2006—pp. 161-177.
(Continued)

*Primary Examiner* — Sath V Perungavoor
*Assistant Examiner* — Nathnael Aynalem
(74) *Attorney, Agent, or Firm* — Gerald E. Hespos; Michael J. Porco; Matthew T. Hespos

(57) ABSTRACT

The invention relates to a method for determining a set of optical imaging functions that describe the imaging of a measuring volume onto each of a plurality of detector surfaces on which the measuring volume can be imaged at in each case a different observation angle by means of detection optics. In addition to the assignment of in each case one image position (x, y) to each volume position (X, Y, Z), the method according to the invention envisages that the shape of the image of a punctiform particle in the measuring volume be described by shape parameter values (a, b, 100 , I) and that the corresponding set of shape parameter values be assigned to each volume position (X, Y, Z) for each detector surface.

8 Claims, 2 Drawing Sheets

(56) References Cited

U.S. PATENT DOCUMENTS

| | | | |
|---|---|---|---|
| 2004/0183909 A1* | 9/2004 | Wieneke | 348/180 |
| 2005/0063581 A1* | 3/2005 | Viala et al. | 382/154 |
| 2008/0123939 A1 | 5/2008 | Wieneke | |

FOREIGN PATENT DOCUMENTS

| | | |
|---|---|---|
| EP | 1 517 150 | 3/2005 |
| JP | H06-028469 | 2/1994 |
| JP | 2008096377 | 4/2008 |

OTHER PUBLICATIONS

B. Wieneke—"Stereo-PIV using self-calibration on particle images", Experiments in Fluids, vol. 39, No. 2, Aug. 1, 2005—pp. 267-280.

Juyang Weng et al.—"Camera Calibration with Distortion Models and Accuracy Evaluation", IEEE Transactions on Pattern Analysis and Machine Intelligence, vol. 14, No. 10, Oct. 1, 1992—pp. 965-980.

S.M. Soloff et al.—"Distortion compensation for generalized stereoscopic particle image velocimetry", Measurement Science and Technology, vol. 8, No. 12, Dec. 1, 1997—pp. 1441-1454.

R.Y. Tsai—"A Versatile Camera Calibration Technique for High-Accuracy 3D Machine Vision Metrology Using Off-the-Shelf TV Cameras and Lenses", IEE Journal of Robotics and Automation USA, vol. RA-3, No. 4, Aug. 1987—pp. 323-344.

M. Raffel u.a.: Particle Image Velocimetry, Springer Verlag, 2. Edition (2007), pp. 48-57 and 164-167.

English translation of the International Preliminary Report on Patentability.

* cited by examiner

METHOD FOR DETERMINING A SET OF OPTICAL IMAGING FUNCTIONS FOR THREE-DIMENSIONAL FLOW MEASUREMENT

BACKGROUND OF THE INVENTION

1. Field of the Invention

The invention relates to a method for determining a set of optical imaging functions that describe the imaging of a measuring volume onto each of a plurality of detector surfaces on which the measuring volume can be imaged at in each case a different observation angle by means of detection optics, comprising the steps:

a) performing pre-calibration, during which for each detector surface the assignment of each volume position in the measuring volume to an image position on the respective detector surface is determined, b) simultaneous imaging of the measuring volume, in which a plurality of optically detectable particles are distributed, onto the detector surfaces, c) determining support positions, namely of the volume positions of at least a few particles, from image positions of corresponding particle images in the images of the measuring volume generated in step b by applying a triangulation method based upon the assignments determined in step a, d) improving the assignments determined in step a by using the support positions determined in step c, so that a set of improved assignments is obtained as a set of the imaging functions to be determined.

The invention further relates to a method for reconstructing a measuring volume with a constellation of optically detectable particles, using a plurality of two-dimensional images of the measuring volume that were recorded simultaneously at, in each case, a different observation angle on each detector surface using detector optics.

2. Description of the Related Art

A generic method for determining a set of imaging functions is known from German patent DE 10 2006 055 746 A1.

Such imaging functions are used in particular in optical methods for determining a three-dimensional velocity field of a flowing fluid in a measuring volume. Typical measuring methods of this kind are known to a person skilled in the art as PIV (Particle Imaging Velocimetry) or PTV (Particle Tracking Velocimetry). In both methods, a fluid carrying optically detectable particles is allowed to flow through a measuring volume. Typically, the particles are excited by suitable illumination to radiate light, e.g. by reflection, scattering, fluorescence, or similar. The emitted light is then transmitted via suitable detection optics simultaneously to several planar detectors on which the measuring volume is imaged, i.e. two-dimensional images of the measuring volume are simultaneously generated on the detector surfaces. The detectors "observe" the measuring volume at different observation angles. Usually, each detector has its own optics. However, since the specific configuration of the optics does not play a role in the present description, the term "detection optics" will be used here to include any optical entity with which the measuring volume is imaged onto the detector surfaces.

Depending on the specific measuring method, the images recorded are used to reconstruct either the individual particle constellation in the volume (3D-PTV) or the voxel-wise intensity distribution of the measuring volume (tomographic PIV; see, for example, EP 1 517 150 B1).

The recording of the image, with subsequent reconstruction, is carried out at least twice at different measuring times. Comparison of the reconstructions provides information on the flow-related shifts that have occurred between the two measuring times. Together with the knowledge of the time interval that has elapsed between the measuring points, it is possible from this to reconstruct a velocity field that represents the flow in the measuring volume.

In order to reconstruct the particle constellation or the voxel-wise intensity distribution in the measuring volume by using the recorded images of the measuring volume, it is necessary to know very precisely how a volume position in the measuring volume is imaged onto an image position on a detector surface. This relationship is described by the so-called imaging function. In particular, the imaging function assigns an image position $(x_i, y_i)$ on an i-th detector surface to each volume position $(X, Y, Z)$ in the measuring volume. Typically, its own imaging function is formulated for each detector, which is why in the context of the present description reference will be made to a set of imaging functions. However, this should also explicitly include situations in which the imaging functions of individual detectors are grouped together, for example in matrix notation, to give an overall imaging function.

The imaging function is typically unique, i.e. exactly one image position on the corresponding detector surface is assigned to each volume position in the measuring volume. However, the reversal of the imaging function is as a rule not unique. In particular, all volume positions on the "line of sight" of a detector are imaged on the same image position of its detector surface. The reversal of the imaging function thus assigns an entire group of volume positions in the measuring volume to individual image positions on the corresponding detector surface.

In order, nevertheless, to arrive at a unique reconstruction, the information of several images is jointly evaluated in a so-called triangulation method. In particular, the reversals of the imaging functions can be applied to the images of an individually identified particle on different detector surfaces. Then, that volume position which is common to all the groups of volume positions which are assigned to the image positions of the particle can be determined as the volume position of the particle. This leads to an overdetermined result even when only two detectors are used. Typically, however, three and more detectors are used, so that a significant overdetermination exists. Due to measuring inaccuracies, this means that the sight lines of the detectors calculated from the particle images do not intersect exactly at a common point. This is the typical situation that arises, in particular when the imaging functions are determined solely by coarse calibration, e.g. using a calibration plate.

As a remedy, the above-mentioned generic German Patent DE 10 2006 055 746 A1 proposes improving the imaging functions. This type of improvement has in the meantime become known in technical circles under the name of "volume self-calibration". In the case of volume self-calibration the volume position of the particle is initially only approximately determined by triangulation. Correction factors for the imaging functions are then calculated, depending on the relative location of the approximately determined volume position of the lines of sight of the detectors predetermined by the imaging functions. Next, triangulation is again carried out with the corrected imaging functions and the volume position is again approximately determined. This procedure is usually iteratively performed until suitable correction factors for the imaging functions are found, in order to determine the volume position of the particle with sufficient accuracy, i.e. within a predetermined tolerance. The improved imaging functions determined in this way are used as the basis for the further procedure—whether it is a PIV or a PTV method.

It is a disadvantage of the known method that, although an improved geometrical assignment of volume points and image points is achieved, other imaging errors however are completely ignored. In particular, imaging errors that are caused by defocusing, spherical aberration or astigmatism of the detection optics are not considered at all. The greater the size of the imaged measuring volume, the more significant such imaging errors become. In particular when carrying out flow analysis of large components, such imaging errors can have a considerable influence on the measuring result.

It is the problem of the present invention to further develop a generic method in such a way that complex imaging errors can be compensated for.

SUMMARY OF THE INVENTION

This problem is solved in conjunction with the features of the preamble to claim 1, in that a shape model, parameterized by shape parameters and having the same shape with which a particle in the measuring volume is imaged onto the detector surfaces, is predetermined and step d of improving the determined assignments comprises the following steps:

d1) determining values of the shape parameters for the support positions determined in step c, using the corresponding particle images, d2) estimating values of the shape parameters for at least the other volume positions of the measuring volume, by applying a mathematical adaptation method based on the values of the shape parameters determined for the support positions in step d1, d3) issuing a set of imaging functions which—for each detector surface—assign to each volume position of the measuring volume a corresponding image position as well as the corresponding shape parameter values estimated in step d2 or determined in step d1.

Firstly, the invention provides for the imaging error to be modeled by a predetermined shape model. This means that a model is predetermined that has the same shape with which a punctiform particle is imaged in the measuring volume on the detector surface, with the shape model being determined by shape parameters whose values may vary from volume position to volume position. For example, a punctiform particle is imaged on the detector surface as a diffraction disk, the size of which depends on how far the particle is offset from the focal plane of the detection optics. Correspondingly, the shape model could be formulated as a circular disk, with the disk diameter as the shape parameter varying from volume point to volume point. However, the imaging errors are typically more complex, so that also a more complex shape of the shape model is advisable. It has been found to be advantageous if the shape model corresponds to a function ellipse, in particular a Gaussian or Airy ellipse. What is meant here by a function ellipse is an ellipse with an intensity distribution taking place according to a defined function. In the case of the Gaussian ellipse, one must imagine an intensity distribution corresponding to the Gaussian bell curve, where the width of the Gaussian bell has a first value in the direction of a maximum extent of the ellipse, and a second value perpendicular thereto. The shape parameters can be the length of the large ellipse axis (e.g. represented by the above-mentioned first value of the bell width), the length of the small ellipse axis (e.g. represented by the above-mentioned second value of the bell width), the angle of inclination of the ellipse and/or a function amplitude (e.g. the amplitude value of the bell). The same applies analogously in the case of other function ellipses, in particular the Airy ellipse, which is based on the known Airy function, or in the case of function ellipses, which are based, for example, on functions that also describe annular particle images.

In addition, the invention provides for the images of the particles to be analyzed according to the shape model and for the shape parameter values to be determined. This can be done, for example, by a mathematical adaptation process (fitting), e.g. by varying the shape parameter values until the deviation between the model and the actual shape of the particle image on the detector surface is minimized. This set of shape parameter values can then be assigned to the volume position of the particle that has been determined by triangulation. This is done for each detector as well as for a plurality of particles, preferably for all imaged particles, although particles that overlap each other should be eliminated from the calculation.

The result of this step is a distribution of support points in the measuring volume, with a set of shape parameter values being assigned to each of these supports points for each detector. Volume positions at which there are no particles, and which can therefore not be identifiably imaged, naturally are not covered by this method of determining the shape parameter values. In order to obtain shape parameter values also between the support positions, the invention further provides that a mathematical adaptation method (fitting) be used to determine the shape parameter values at volume positions between and outside the support positions. This adaptation can be based on a physically, in particular optically founded mathematical model. It has however proved advantageous in this case to select a simple polynomial or spline adaptation method. Preferably, attention should be paid to ensure that a statistically robust method is used that is suitable to eliminate so-called "outliers".

The result of this step is that a set of shape parameter values is now assigned to each volume position—regardless whether a support position exists or not—for each detector, whether the set of values is estimated or directly determined.

These sets of shape parameter values are finally added in a suitable form (depending on the selected configuration of the shape model) to the so far purely geometrical imaging function, especially as an additional folding term. These improved imaging functions, which assign to each volume position in the measuring volume not just a pure image position on the detector surfaces, but also a shape with which a punctiform particle at the volume position would be imaged on the image position, represent the result of the method according to the invention, i.e. the imaging functions according to the invention.

It should be mentioned that typically two sets of shape parameter values may alternatively be used for the support positions, namely the directly determined values or those that are obtained from the mathematical adaptation method for the support positions. Depending on the quality of the mathematical adaptation model, these two sets of shape parameter values should differ only very slightly from each other. In order to avoid discontinuities, the estimated parameter values are typically preferred over those that are directly determined.

As described, the present invention differs from the generic prior art in the configuration of the improvement step. However, the steps according to the invention do not necessarily have to be taken as an alternative to the known volume self-calibration. Instead, in a preferred embodiment of the invention, provision is made that before the values for the shape parameters are determined, the support positions determined by triangulation are corrected by applying a volume self-calibration method. In other words, this means that, to start with, an improved geometrical imaging function is determined according to the generic prior art, and this is then again improved by adding the shape parameters in accordance with the invention.

As already described at the beginning, imaging functions are applied in particular for reconstructing a measuring volume with a constellation of optically detectable particles, especially within the context of velocity field measurements in flows. Such a method, having the features of the preamble to claim 5, can be improved in the manner according to the invention by the step of predetermining an initial constellation of particles in the measuring volume, as well as by iterative application of the following steps:

- application of a set of imaging functions, determined by using the method according to the invention, to the measuring volume having the predetermined particle constellation, in order to calculate virtual images of the measuring volume,
- comparing the virtual images with the recorded images in order to determine differences between the virtual and the recorded images,
- modifying the assumed initial constellation as a function of the differences determined, with the iteration being carried out until the differences determined between the virtual and the recorded images are smaller than a predetermined tolerance.

"Applying" the imaging function in this case essentially means carrying out folding of the imaging function with the actual particle size or voxel size (see below). In optical arrangements with diffraction-limited resolution, i.e. applications in which the particles are so small in relation to the resolution capability of the optics that they may be assumed to be "punctiform", the folding is reduced essentially to a multiplication.

The reconstruction method according to the invention thus essentially provides volume reconstruction, which is basically known to a person skilled in the art, by applying the imaging functions as determined in accordance with the invention. The volume reconstruction may be nothing more than a reconstruction of an actual particle constellation, as in the PTV method. But it is also possible, for example as in the case of the tomographic PIV method, to subdivide the measuring volume into a plurality of voxels, to apply the set of imaging functions in voxel-wise fashion, and instead of pre-setting an initial constellation of particles in the measuring volume, to pre-set a voxel-wise intensity distribution in the measuring volume. This method is suitable especially in the case of high particle densities in which PTV methods that are optimized for low particle densities are not applicable or only yield poor results.

Further features and advantages of the invention are apparent from the following, specific description as well as from the drawings:

DETAILED DESCRIPTION OF THE PREFERRED EMBODIMENTS

Figure 1:
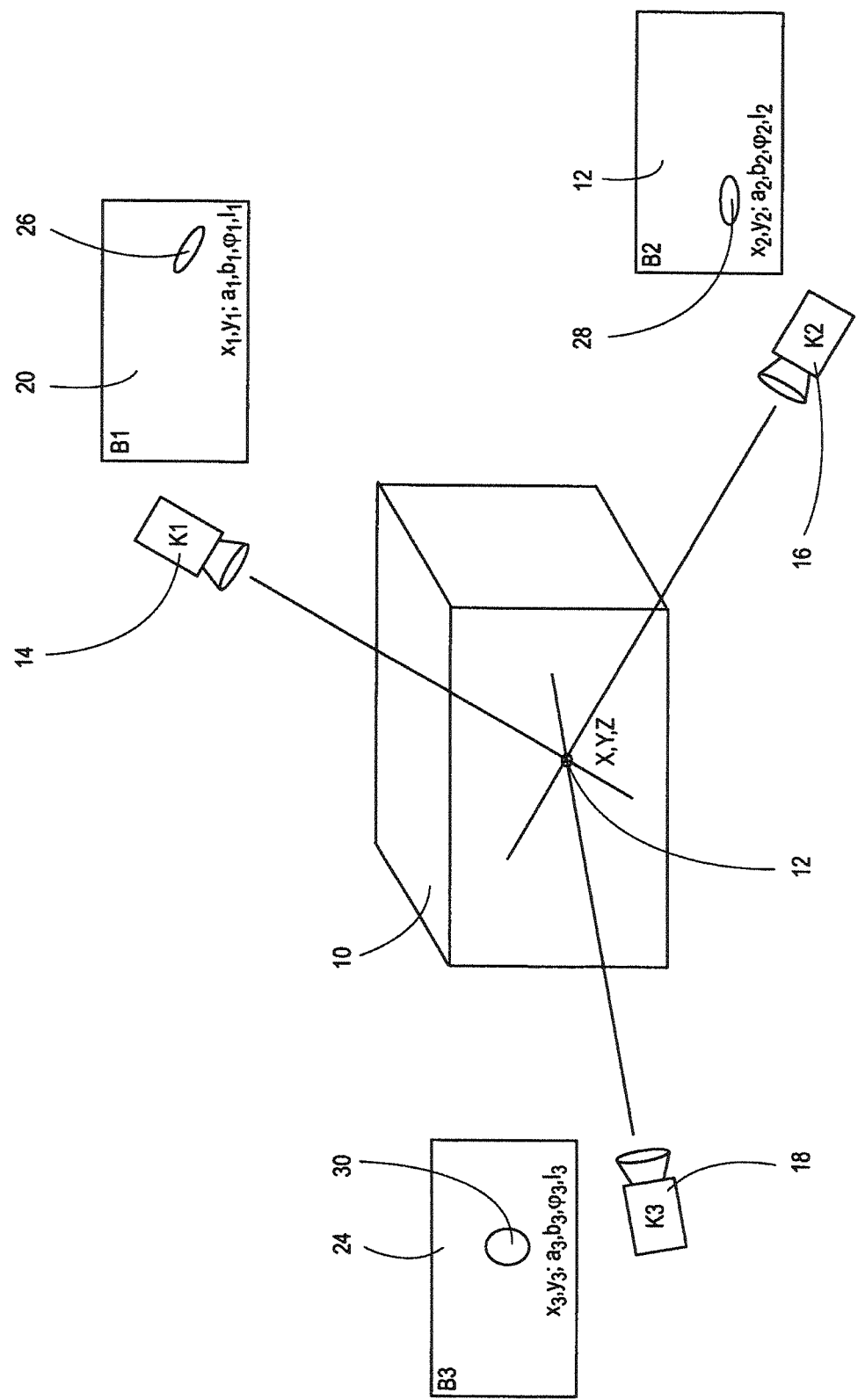
FIG. 1 is a diagrammatic view of an experimental set-up for carrying out a measuring method, within the context of which the procedure according to the invention can be applied.

FIG. 1 shows a diagrammatic set-up of the kind that can typically be used for a three-dimensional PTV or PIV method. A fluid, which is not shown in more detail, that is seeded with optically detectable particles, e.g. reflecting, scattering or fluorescing glass or plastic beads, flows through a measuring volume 10. For the sake of clarity, only one particle 12 is shown at the volume position (X, Y, Z) in the measuring volume 10. The measuring volume 10 and in particular the particle 12 is recorded by three detectors 14, 16, 18, which are configured, for example, as CCD cameras. In order to simplify the following explanation, the detectors are numbered 14, 16, 18 consecutively and in the following are referred to as cameras K1, K2 and K3. It is important that the detectors 14, 16, 18 are planar detectors, i.e. they have a light-sensitive detector surface on which the image of the volume and in particular the image of the particle 12 is stored as a two-dimensional projection. Such images 20, 22, 24 are shown in diagrammatic form in FIG. 1 together with the respective cameras, and for easier assignability to the respective cameras they are designated B1, B2 and B3.

Because of the relative positions of the detectors 14, 16, 18, and also because of the special configuration of the detection optics, e.g. the lenses of the cameras K1, K2, K3, the particle 12 at the volume position (X, Y, Z) is imaged at different positions respectively in the images B1, B2 and B3. In the following, these image positions are depicted by the lower-case letters x, y together with the respective index of the associated image or the associated camera. For example, particle 12 in the image B1 recorded by the camera K1 is depicted at the image position (x1, y1). In image B2, which was recorded by camera K2, particle 12 is imaged at the image position (x2, y2). In image B3 recorded by camera K3, the particle 12 is imaged at the image position (x3, y3). The determination of appropriate imaging functions that describe the imaging of the volume position (X, Y, Z) onto the image positions (x1, y1), (x2, y2) or (x3, y3), is known, together with special geometrical improvement methods, from prior art.

In addition, the present invention takes account of the circumstance that, especially in the case of a large measuring volume 10, the imaging of a particle 12 in the measuring volume 10 does not necessarily result in a punctiform particle image. Instead, due to defocusing, spherical aberrations and other imaging errors, the particle image may have a shape that is generally known as a "diffraction disk". Such diffraction disks of various configurations are used in FIG. 1 to diagrammatically display the particle images. In particular, the inventors have found that the shape of the diffraction disks can be very well described as so-called function ellipses. In order to explain the concept of a function ellipse, reference is made to FIG. 2 that is discussed in more detail in the following. The function ellipses 26, 28, 30 can be characterized by a set of shape parameters. This means that the shapes of the diffraction disks are always assumed according to the same model parameterized by the shape parameters, although the values of the shape parameters need to be determined in individual cases. In particular, the values of the shape parameters depend on the respectively imaged volume position in the measuring volume 10. Furthermore, the shape parameters also depend on the relative position of the detectors 14, 16 18 and on the detection optics used. Therefore, the invention envisages that the values of the shape parameters be determined for each volume position in the measuring volume 10, and that a purely geometrical imaging function that assigns an image position to this volume position be extended by these shape parameter values, so that an image position and an image shape that is predetermined by the shape parameter values are assigned to each volume position. This takes place separately for each detector.

In the embodiment shown, as will be explained in detail further below in connection with FIG. 2, the parameters a, b, φ and I are used as shape parameters. In other words, in the image B1, in addition to the image position (x1, y1) the shape defined by the set of shape parameter values (a1, b1, φ1, I1) is also assigned to the volume position (X, Y, Z) for imaging by the first camera K1. For imaging by the second camera K2, in image B2, in addition to the image position (x2, y2) the shape defined by the set of shape parameter values (a2, b2, φ2, I2) is also assigned to the volume position (X, Y, Z). Correspondingly, in image B3 recorded by the third camera K3, in addition to the image position (x3, y3), the shape defined by the set of shape parameter values (a3, b3, φ3, I3) is also assigned to the volume position (X, Y, Z).

Figure 2:
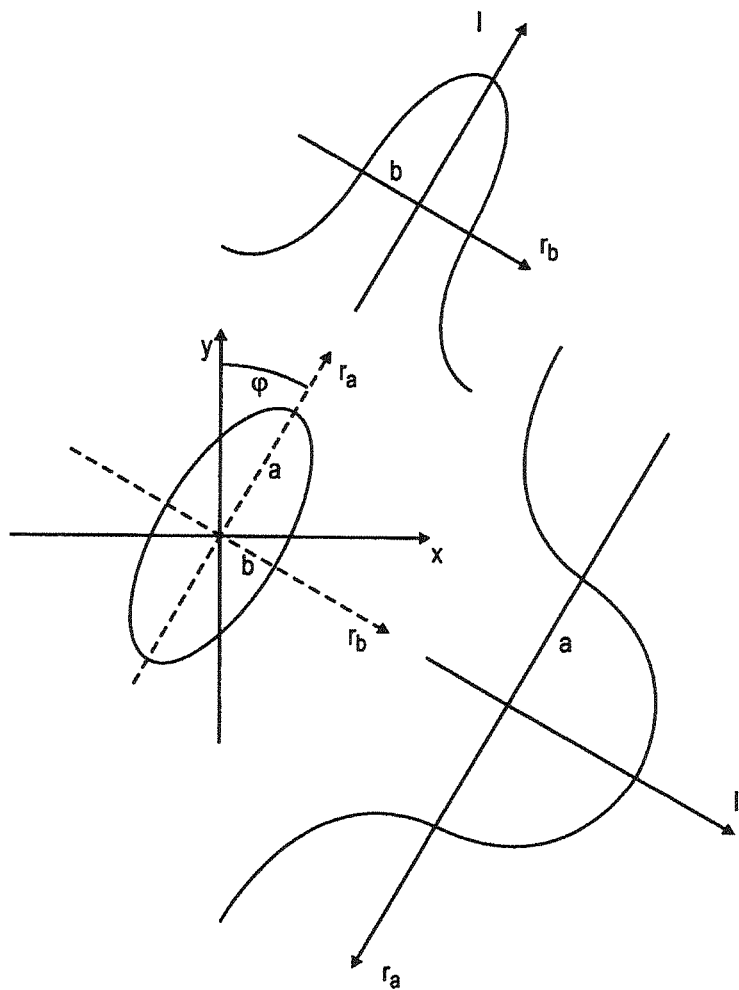
FIG. 2 is a sketch to explain function ellipses.

FIG. 2 shows a sketch explaining the concept of the function ellipse. A 2D Gaussian ellipse may be given as an example. This has the form:

$$f_{2D-Gauss}(x', y') = I \exp\left[-\frac{1}{2}\left(\frac{x'^2}{a^2} + \frac{y'^2}{b^2}\right)\right],$$

where $$x' = x\cos\varphi + y\sin\varphi$$
$$y' = y\cos\varphi - x\sin\varphi,$$

where I represents the height of the bell curve at the zero point, a or b is the half-value width of the bell curve, x and y are the two-dimensional space coordinates, and φ is the angle of inclination of the 2D Gaussian ellipse relative to the x/y coordinate system. The assumption of a particle image as a Gaussian ellipse means that it is assumed that a punctiform particle in the measuring volume is imaged onto a diffraction disk in the image, said disk having an elliptical outline and having an intensity that exhibits a Gaussian profile along the long as well as the short axis of the ellipse. Of course, such a diffraction disk does not have a sharp outline but exhibits an intensity that tends asymptotically to zero. Certain substitute values are therefore needed in order to define a clear shape model. Here, for example, the half-value width of the respective Gaussian bell can be defined as the length of the respective axis a or b of the ellipse. It goes without saying that other definitions are also possible.

Although the shape model of the above-described Gaussian ellipse has proved to be particularly advantageous, other function ellipses or, more generally, other shape models are also conceivable. It is also favorable to use an Airy ellipse in which the Gaussian function is replaced by the known Airy function.

In order to determine the shape parameter values for each volume position (X, Y, Z) a simultaneous recording is first made of the volume that is seeded with particles, using all three detectors 14, 16, 18. This results in simultaneously recorded images B1, B2 and B3. By means of known triangulation and possibly additional, geometrical improvements of the triangulation, the volume positions (X, Y, Z) of the particles are determined as accurately as possible, using the particle images at the positions (x1, y1), (x2, y2) and (x3, y3). Then the predetermined shape model is applied to the particle images. This means that the shape parameter values must be varied until the greatest possible agreement exists between the shape of the diffraction disk calculated by using the shape model, and the recorded diffraction disk. For this purpose statistically robust methods that are capable of eliminating outliers should be used. This happens in each of the images B1, B2 and B3. Then, from the corresponding shape parameter values and the associated image position coordinates, the improved imaging function, which defines not only the imaging location but also the imaging shape for the corresponding particle on the three images B1, B2 and B3, is formulated for each particle position. These parameter values are then used as support positions for estimating the parameter values for the volume position of the measuring volume that is not occupied by particles. A person skilled in the art is familiar with a number of mathematical adaptation methods (fit methods), of which a simple polynomial adaptation method has proved to be perfectly suitable. It goes without saying that other adaptation methods may also be used that, for example, describe a physically based model of the progression of certain shape parameters.

The improved imaging functions thus determined can be used in a typical PTV or PIV method in the same way as the already known, purely geometrical imaging functions. Therefore it is superfluous at this point to given any further explanation.

Of course, the embodiments discussed in the specific description and shown in the Figures are merely illustrative exemplary embodiments of the present invention. In the light of this disclosure a person skilled in the art is given a wide range of possible variations. In particular, the choice of the shape model and the specific configuration of the shape parameters can be adapted to the particular characteristics of the individual case, in particular the specific characteristics of the detection optics. For example, instead of the preferred Gaussian or Airy ellipses, it would also be possible to use a Poisson ellipse, or similar.

The invention claimed is:

1. A method for determining a set of optical imaging functions which describe the imaging of a measuring volume (10) onto each of a plurality of detector surfaces on which the measuring volume (10) can be imaged at in each case a different observation angle by means of detector optics, comprising the steps:

a) performing pre-calibration, during which for each detector surface the assignment of each volume position (X, Y, Z) in the measuring volume (10) to an image position ($x_i$, $y_i$) is determined on the respective detector surface, b) simultaneous imaging of the measuring volume (10), in which a plurality of optically detectable particles (12) are distributed, on the detector surfaces, c) determining of support positions, namely of the volume positions (X, Y, Z) of at least a few particles (12), from corresponding image positions ($x_i$, $y_i$) of particle images in the images (20, 22, 24) of the measuring volume (10) generated in step b by application of a triangulation method based upon the assignments determined in step a, d) improving the assignments determined in step a by using the support positions determined in step c, so that a set of improved assignments results as a set of the imaging functions to be determined, characterized in that a shape model, parameterized by shape parameters (a, b, φ, I) and having the shape with which a particle (12) in the measuring volume (10) is imaged onto the detector surfaces, is predetermined, and in that step d of improving the determined assignments comprises the steps:

d1) determining of values of the shape parameters (a, b, φ, I) for the support positions determined in step c, using the corresponding particle images, d2) estimating of values of the shape parameters (a, b, φ, I) for all volume positions (X, Y, Z) of the measuring volume (10) by application of a mathematical adaptation method based upon the values of the shape parameters ($a, b, \phi, I$) determined in step d1 for the support positions, d3) issuance of a set of imaging functions which, for each detector surface, assign to each volume position (X, Y, Z) of the measuring volume (10) a corresponding image position ($x_i$, $y_i$) as well as the corresponding shape parameter values ($a_i$, $b_i$, $\phi_i$, $I_i$) estimated in step d2 or determined in step d1.

2. A method according to claim 1, characterized in that the shape model corresponds to a function ellipse, and the shape parameters represent at least one of the length of the small ellipse axis (a), the length of the large ellipse axis (b), the ellipse inclination angle ($\phi$) and/or a functional amplitude (I).

3. A method according to claim 1, characterized in that the mathematical adaptation method in step d2 is a polynomial or spline adaptation method.

4. A method according to claim 1, characterized in that prior to determining the values for the shape parameters ($a_i$, $b_i$, $\phi_i$, $I_i$) in step d1, the support positions determined by triangulation in step c are corrected by application of a volume self-calibration method.

5. A method for reconstructing a measuring volume (10) with a constellation of optically detectable particles (12) using a plurality of two-dimensional images (20, 22, 24) of the measuring volume (10), which were simultaneously taken by means of one detector optics for in each case one detector surface at different observation angles in each case, characterized by a step involving the pre-setting of an initial constellation of particles (12) in the measuring volume (10), as well as by iterative application of the steps:

application of a set of imaging functions, determined according to claim 1, to the measuring volume (10) with the predetermined particle constellation for the calculation of virtual images of the measuring volume (10), comparison of the virtual images with the recorded images, for determining any differences between the virtual images and the recorded ones, changing of the assumed initial constellation depending on the differences determined, with the iteration being continued until the differences determined between the virtual images and the recorded images are smaller than a predetermined tolerance or until a predetermined number of iteration loops has been passed through.

6. A method for the reconstruction of a measuring volume (10) with a constellation of optically detectable particles (12), using a plurality of two-dimensional images (20, 22, 24) of the measuring volume (10), which were simultaneously recorded by means of one detector optics per detector surface at different observation angles in each case, characterized by a step involving the pre-setting of an initial intensity distribution in the measuring volume (10), which is subdivided into a plurality of voxels, as well as by iterative application of the steps:

applying a set of imaging functions, determined according to claim 1, to the measuring volume (10) with the predetermined intensity distribution for the calculation of virtual images of the measuring volume (10), comparing the virtual images with the images recorded, for determining any differences between the virtual images and the recorded images, changing of the assumed initial intensity distribution depending on the differences determined, with the iteration being continued until the differences determined between the virtual images and the ones recorded are smaller than a predetermined tolerance or until a predetermined number of iteration loops has been passed through.

7. A method according to claim 6, characterized in that the initial intensity distribution assumes the same intensity in all voxels of the measuring volume.

8. A method according to claim 2, wherein the function ellipse is a two-dimensional Gaussian ellipse or an Airy ellipse.

* * * * *